(12) United States Patent
Noda et al.

(10) Patent No.: US 9,799,461 B2
(45) Date of Patent: Oct. 24, 2017

(54) POWER STORAGE DEVICE AND METHOD FOR MANUFACTURING ELECTRODE

(75) Inventors: Kosei Noda, Kanagawa (JP); Kazutaka Kuriki, Kanagawa (JP); Nobuhiro Inoue, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 135 days.

(21) Appl. No.: 13/596,189

(22) Filed: Aug. 28, 2012

(65) Prior Publication Data

US 2013/0230772 A1    Sep. 5, 2013

(30) Foreign Application Priority Data

Sep. 2, 2011  (JP) ................................. 2011-191516

(51) Int. Cl.
*H01M 4/38*  (2006.01)
*H01M 4/48*  (2010.01)
(Continued)

(52) U.S. Cl.
CPC ............. *H01G 11/68* (2013.01); *H01G 11/06* (2013.01); *H01G 11/28* (2013.01); *H01G 11/30* (2013.01);
(Continued)

(58) Field of Classification Search
USPC .......................... 429/211; 427/79, 123, 126.3
See application file for complete search history.

(56) References Cited

U.S. PATENT DOCUMENTS

| 5,015,547 A | 5/1991 | Koshiba et al. |
|---|---|---|
| 5,338,625 A | 8/1994 | Bates et al. |

(Continued)

FOREIGN PATENT DOCUMENTS

| CN | 001639889 A | 7/2005 |
|---|---|---|
| JP | 04-080331 | 3/1992 |

(Continued)

OTHER PUBLICATIONS

Zhou.X et al., "Graphene modified LiFePO4 cathode materials for high power lithium ion batteries ,", J. Mater. Chem. (Journal of Materials Chemistry), 2011, vol. 21, pp. 3353-3358.

(Continued)

*Primary Examiner* — Osei Amponsah
(74) *Attorney, Agent, or Firm* — Nixon Peabody LLP; Jeffrey L. Costellia (57) ABSTRACT

As an electrode for a power storage device, an electrode including a current collector, a first active material layer over the current collector, and a second active material layer that is over the first active material layer and includes a particle containing niobium oxide and a granular active material is used, whereby the charge-discharge cycle characteristics and rate characteristics of the power storage device can be improved. Moreover, contact between the granular active material and the particle containing niobium oxide makes the granular active material physically fixed; accordingly, deterioration due to expansion and contraction of the active material which occur along with charge and discharge of the power storage device, such as powdering of the active material or its separation from the current collector, can be suppressed.

18 Claims, 6 Drawing Sheets

(51) Int. Cl.
*H01G 11/68* (2013.01)
*H01G 11/06* (2013.01)
*H01G 11/28* (2013.01)
*H01G 11/30* (2013.01)
*H01G 11/46* (2013.01)
*H01G 11/86* (2013.01)
*H01M 4/131* (2010.01)
*H01M 4/134* (2010.01)
*H01M 4/1391* (2010.01)
*H01M 4/1395* (2010.01)
*H01M 4/36* (2006.01)
*H01M 10/052* (2010.01)

(52) U.S. Cl.
CPC ............. *H01G 11/46* (2013.01); *H01G 11/86* (2013.01); *H01M 4/131* (2013.01); *H01M 4/134* (2013.01); *H01M 4/1391* (2013.01); *H01M 4/1395* (2013.01); *H01M 4/366* (2013.01); *H01M 4/386* (2013.01); *H01M 4/387* (2013.01); *H01M 4/48* (2013.01); *H01M 10/052* (2013.01); *H01M 4/483* (2013.01); *Y02E 60/13* (2013.01); *Y02T 10/7011* (2013.01); *Y02T 10/7022* (2013.01)

(56) References Cited

U.S. PATENT DOCUMENTS

| | | | |
|---|---|---|---|
| 6,063,142 A | 5/2000 | Kawakami et al. | |
| 6,218,050 B1 | 4/2001 | Yoon et al. | |
| 6,333,128 B1 | 12/2001 | Sunagawa et al. | |
| 6,685,804 B1 | 2/2004 | Ikeda et al. | |
| 6,828,063 B2 | 12/2004 | Park et al. | |
| 6,887,511 B1 | 5/2005 | Shima et al. | |
| 7,179,561 B2 | 2/2007 | Niu et al. | |
| 7,192,673 B1 | 3/2007 | Ikeda et al. | |
| 7,235,330 B1 | 6/2007 | Fujimoto et al. | |
| 7,241,533 B1 | 7/2007 | Ikeda et al. | |
| 7,285,359 B2* | 10/2007 | Yamamoto | H01M 4/13 252/182.1 |
| 7,410,728 B1 | 8/2008 | Fujimoto et al. | |
| 7,745,047 B2 | 6/2010 | Zhamu et al. | |
| 7,781,101 B2 | 8/2010 | Okazaki et al. | |
| 7,794,881 B1 | 9/2010 | Fujimoto et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,048,563 B2 | 11/2011 | Konishiike et al. | |
| 8,080,335 B2 | 12/2011 | Kawakami et al. | |
| 8,080,337 B2 | 12/2011 | Higuchi et al. | |
| 8,278,011 B2 | 10/2012 | Zhu et al. | |
| 8,399,132 B2 | 3/2013 | Park | |
| 8,709,654 B2 | 4/2014 | Takeuchi et al. | |
| 2002/0168574 A1 | 11/2002 | Ahn et al. | |
| 2003/0129497 A1* | 7/2003 | Yamamoto | H01M 4/131 429/246 |
| 2004/0101761 A1 | 5/2004 | Park et al. | |
| 2004/0126659 A1 | 7/2004 | Graetz et al. | |
| 2005/0008935 A1 | 1/2005 | Skotheim et al. | |
| 2006/0040182 A1 | 2/2006 | Kawakami et al. | |
| 2007/0007239 A1 | 1/2007 | Lee et al. | |
| 2007/0092797 A1* | 4/2007 | Konishiike et al. | 429/218.1 |
| 2007/0148549 A1* | 6/2007 | Kobayashi et al. | 429/231.95 |
| 2008/0003503 A1 | 1/2008 | Kawakami et al. | |
| 2008/0057401 A1* | 3/2008 | Mori | H01M 4/133 429/303 |
| 2008/0254296 A1 | 10/2008 | Handa et al. | |
| 2009/0029264 A1 | 1/2009 | Nakazawa et al. | |
| 2009/0136847 A1 | 5/2009 | Jeong et al. | |
| 2009/0169996 A1 | 7/2009 | Zhamu et al. | |
| 2009/0214958 A1* | 8/2009 | Park | 429/324 |
| 2009/0311608 A1 | 12/2009 | Hirose et al. | |
| 2010/0143798 A1 | 6/2010 | Zhamu et al. | |
| 2010/0176337 A1 | 7/2010 | Zhamu et al. | |
| 2010/0209784 A1 | 8/2010 | Yamazaki et al. | |
| 2010/0248034 A1 | 9/2010 | Oki et al. | |
| 2010/0330421 A1 | 12/2010 | Cui et al. | |
| 2011/0012067 A1 | 1/2011 | Kay | |
| 2011/0052997 A1* | 3/2011 | Kim et al. | 429/231.95 |
| 2011/0084229 A1 | 4/2011 | Kawakami et al. | |
| 2011/0097627 A1 | 4/2011 | Watanabe et al. | |
| 2011/0111303 A1 | 5/2011 | Kung et al. | |
| 2011/0121240 A1 | 5/2011 | Amine et al. | |
| 2011/0151290 A1 | 6/2011 | Cui et al. | |
| 2011/0159372 A1 | 6/2011 | Zhamu et al. | |
| 2011/0177396 A1 | 7/2011 | Moriwaka et al. | |
| 2011/0229795 A1 | 9/2011 | Niu et al. | |
| 2011/0250509 A1 | 10/2011 | Yamaguchi et al. | |
| 2011/0266654 A1 | 11/2011 | Kuriki et al. | |
| 2011/0291240 A1 | 12/2011 | Yamazaki | |
| 2012/0045692 A1 | 2/2012 | Takemura et al. | |
| 2012/0064409 A1* | 3/2012 | Zhamu | B82Y 30/00 429/221 |
| 2012/0141866 A1 | 6/2012 | Kuriki et al. | |
| 2012/0328956 A1 | 12/2012 | Oguni et al. | |
| 2013/0052528 A1 | 2/2013 | Kuriki et al. | |
| 2013/0164619 A1 | 6/2013 | Yamakaji et al. | |
| 2013/0266858 A1 | 10/2013 | Inoue et al. | |
| 2013/0323585 A1 | 12/2013 | Inoue et al. | |

FOREIGN PATENT DOCUMENTS

| | | |
|---|---|---|
| JP | 09-125254 A | 5/1997 |
| JP | 11-060385 | 3/1999 |
| JP | 11-096993 A | 4/1999 |
| JP | 2000-351610 A | 12/2000 |
| JP | 2001-210315 | 8/2001 |
| JP | 2001-283834 A | 10/2001 |
| JP | 2002-083594 | 3/2002 |
| JP | 2004-014381 A | 1/2004 |
| JP | 2004-281317 | 10/2004 |
| JP | 2004-303593 | 10/2004 |
| JP | 2005-272983 | 10/2005 |
| JP | 2005-302510 A | 10/2005 |
| JP | 2005-332769 A | 12/2005 |
| JP | 2006-059641 A | 3/2006 |
| JP | 2007-005201 | 1/2007 |
| JP | 2007-122915 A | 5/2007 |
| JP | 2008-016446 A | 1/2008 |
| JP | 2009-146712 A | 7/2009 |
| JP | 2009-164014 | 7/2009 |
| JP | 2010-244847 A | 10/2010 |
| JP | 2010-250968 | 11/2010 |
| JP | 2010-282959 A | 12/2010 |
| JP | 2011-159534 | 8/2011 |
| JP | 2013-051033 A | 3/2013 |
| JP | 2013-065547 A | 4/2013 |
| WO | WO-2006/062947 A2 | 6/2006 |
| WO | WO-2007/061945 A2 | 5/2007 |
| WO | WO-2009/061685 A1 | 5/2009 |
| WO | WO-2009/127901 A1 | 10/2009 |
| WO | WO-2009/144600 A2 | 12/2009 |
| WO | WO 2010-125467 A1 | 11/2010 |

OTHER PUBLICATIONS

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

Chinese Office Action (Application No. 201210317652.9) Dated Oct. 10, 2015.

Kamins et al., "Ti-Catalyzed Si Nanowires by Chemical Vapor Deposition: Microscopy and Growth Mechanisms", Journal of Applied Physics, vol. 89, No. 2, pp. 1008-1016.

Kohno et al., "Silicon Nanoneedles Grown by a Simple Thermal Treatment Using Metal-Sulfur Catalysts" Japanese Journal of Applied Physics, Feb. 1, 2002, vol. 41, No. 2A, pp. 577-578.

(56) References Cited

OTHER PUBLICATIONS

Cui et al., Crystalline-Amorphous Core-Shell Silicon Nanowires for High Capacity and High Current Battery Electrodes, Nano Letters, 2009, vol. 9, No. 1, pp. 491-495.

* cited by examiner

POWER STORAGE DEVICE AND METHOD FOR MANUFACTURING ELECTRODE

BACKGROUND OF THE INVENTION

1. Field of the Invention

The present invention relates to a power storage device and a method for manufacturing an electrode.

Note that a power storage device in this specification refers to every element or device which has a function of storing electric power.

2. Description of the Related Art

In recent years, a variety of power storage devices such as lithium secondary batteries, lithium-ion capacitors, and air cells have been developed. In particular, a lithium secondary battery in which charge and discharge are performed by transfer of lithium ions between a positive electrode and a negative electrode has been attracting attention as a secondary battery with high output and high energy density.

An electrode used for a power storage device is manufactured by forming an active material layer over one surface of a current collector. The active material layer is formed using an active material such as carbon or silicon, which can store and release ions serving as carriers. For example, when an active material layer is formed using silicon or phosphorus-doped silicon, the theoretical capacity is higher than that in the case where the active material layer is formed using carbon, which is advantageous in increasing the capacity of a power storage device (see Patent Document 1).

However, it is known that the volume of silicon serving as an active material is expanded when lithium ions are inserted and contracted when lithium ions are extracted. Therefore, a problem arises in that an active material layer is powdered and detached from a current collector along with charge and discharge, for example. As a result, the current collecting property in an electrode is decreased and the charge-discharge cycle characteristics are degraded. As a countermeasure against this, there is a method in which a surface of an active material layer is coated with carbon, copper, nickel, or the like to suppress powdering and separation of silicon. However, such coating may inhibit reaction between lithium and silicon and may reduce the charge-discharge capacity.

REFERENCE

Patent Document

[Patent Document 1] Japanese Published Patent Application No. 2001-210315

SUMMARY OF THE INVENTION

An object of one embodiment of the present invention is to provide a power storage device having better cycle characteristics and rate characteristics and to provide a method for manufacturing an electrode for the power storage device.

One embodiment of the present invention is a power storage device which includes an electrode including a current collector, a first active material layer over the current collector, and a second active material layer that is over the first active material layer and includes a particle containing niobium oxide and a granular active material.

One embodiment of the present invention is a power storage device which includes a negative electrode including a current collector, a first active material layer over the current collector, and a second active material layer that is over the first active material layer and includes a particle containing niobium oxide and a granular active material; an electrolyte in contact with the negative electrode; and a positive electrode facing the negative electrode with the electrolyte interposed therebetween.

In the power storage device of one embodiment of the present invention, the first active material layer and the active material each contain one or more materials selected from silicon, tin, aluminum, and germanium. The above materials can be alloyed with lithium, and an impurity such as phosphorus or boron may be added to such a material to reduce electric resistance.

One embodiment of the present invention is a method for manufacturing an electrode, which includes the steps of forming a first active material layer over a current collector; applying, to the first active material layer, slurry including a binder, a conductive additive, a particle containing niobium oxide, and a granular active material; and performing baking. In the method, the particle containing niobium oxide is formed by a sol-gel method.

In the method for manufacturing an electrode of one embodiment of the present invention, the first active material layer and the active material each contain one or more materials selected from silicon, tin, aluminum, and germanium. The above materials can be alloyed with lithium, and an impurity such as phosphorus or boron may be added to such a material to reduce electric resistance.

Further, each of the first active material layer and the active material forms an alloy with lithium and can occlude and release lithium ions reversibly. For example, silicon is preferably used because the theoretical capacity of silicon is 4000 mAh/g, which is approximately ten times the theoretical capacity, 372 mAh/g, of a lithium battery in which graphite that is a commonly-used material is used as a negative electrode active material. However, as described above, the volume of silicon serving as an active material changes significantly owing to charge and discharge by insertion and extraction of lithium ions. Accordingly, a defect such as powdering of the active material or its separation from a current collector is caused along with charge and discharge, leading to serious deterioration in charge-discharge cycles.

In one embodiment of the present invention, contact between the granular active material and the particle containing niobium oxide makes the granular active material physically fixed; accordingly, deterioration due to expansion and contraction of the active material which occur along with charge and discharge of the power storage device, such as powdering of the active material, can be suppressed. For this reason, it is preferable that a large number of particles containing niobium oxide be in contact with the granular active material. Niobium oxide is excellent in conducting ions serving as carriers (e.g., lithium ions) and does not inhibit a battery function even when it covers an active material. However, if niobium oxide, which has low electric conductivity, completely wraps the active material, the niobium oxide serves as a resistor between the current collector and the active material, resulting in degradation in rate characteristics of the battery.

Thus, the first active material layer is formed over the current collector before the second active material layer including the particle containing niobium oxide and the granular active material is formed over the current collector, whereby an electric resistor of niobium oxide can be prevented from being formed between the current collector and the active material.

The first active material layer, the active material, and the niobium oxide have no limitation on their crystallinity and may be amorphous, microcrystalline, or single-crystal. In addition, a material having two or more kinds of crystallinity may be used.

Further, the particle containing niobium oxide may contain a lithium niobate such as $Li_2Nb_2O_5$.

The $Li_2Nb_2O_5$ is formed by reaction between $Nb_2O_5$ and Li in initial discharge of the battery. In charge and discharge thereafter, the $Li_2Nb_2O_5$ may be held, or Li may be desorbed from the $Li_2Nb_2O_5$ so that $Nb_2O_5$ is formed. Thus, the $Li_2Nb_2O_5$ formed in contact with the active material functions as a stable inorganic solid electrolyte interface (SEI) instead of an organic SEI, thereby having effects of reduction in resistance, improvement in lithium diffusivity, suppression of volume expansion of the active material, and the like.

The electrode used for the power storage device is manufactured in such a manner that the first active material layer is formed over the current collector and the second active material layer including the particle containing niobium oxide and the granular active material is formed over the first active material layer, whereby the cycle characteristics and rate characteristics of the power storage device can be improved.

In addition, the conductive additive or the binder, which is used for manufacture of the electrode, may include the particle containing niobium oxide.

As a material for the current collector, a material with high electric conductivity can be used, such as a metal element typified by platinum, aluminum, or copper. Alternatively, the current collector may be formed using a metal element that forms silicide by reacting with silicon.

In the power storage device, the electrolyte which is provided between the negative electrode and the positive electrode facing the negative electrode can be formed using a liquid or a solid, and the electrolyte may include the particle containing niobium oxide.

According to one embodiment of the present invention, in the electrode including the first active material layer over the current collector and the second active material layer that is over the first active material layer and includes the particle containing niobium oxide and the granular active material, a carbon-based film can be formed over the second active material layer.

The carbon-based film is formed of a membranous carbon-based material and includes graphite, a single layer of graphene, or a stack of 100 or less layers, preferably 10 or more and 30 or less layers, of graphene. When 2 to 3 layers of graphene are stacked, the thickness of the membranous carbon-based material is 1 nm to 2 nm. The membranous carbon-based material may be either amorphous or crystalline.

Such a membranous carbon-based material is advantageous in that it can serve as a conductive additive to form a wide conductive network.

According to one embodiment of the present invention, deterioration of a power storage device due to separation of an active material, or the like can be reduced. Thus, a power storage device having better cycle characteristics and rate characteristics can be provided.

DETAILED DESCRIPTION OF THE INVENTION

Hereinafter, embodiments of the present invention will be described with reference to the drawings. Note that the present invention is not limited to the following description and it will be readily appreciated by those skilled in the art that modes and details of the present invention can be modified in various ways without departing from the spirit and scope thereof. Thus, the present invention should not be construed as being limited to the description of the following embodiments. In description using the drawings for reference, in some cases, the same reference numerals are used in common for the same portions in different drawings. Further, in some cases, the same hatching patterns are applied to similar portions, and the similar portions are not necessarily designated by reference numerals.

(Embodiment 1)

In this embodiment, an electrode of a power storage device which is one embodiment of the present invention and a method for manufacturing the electrode are described with reference to FIGS. 1A and 1B and FIG. 2.

Figure 1A:
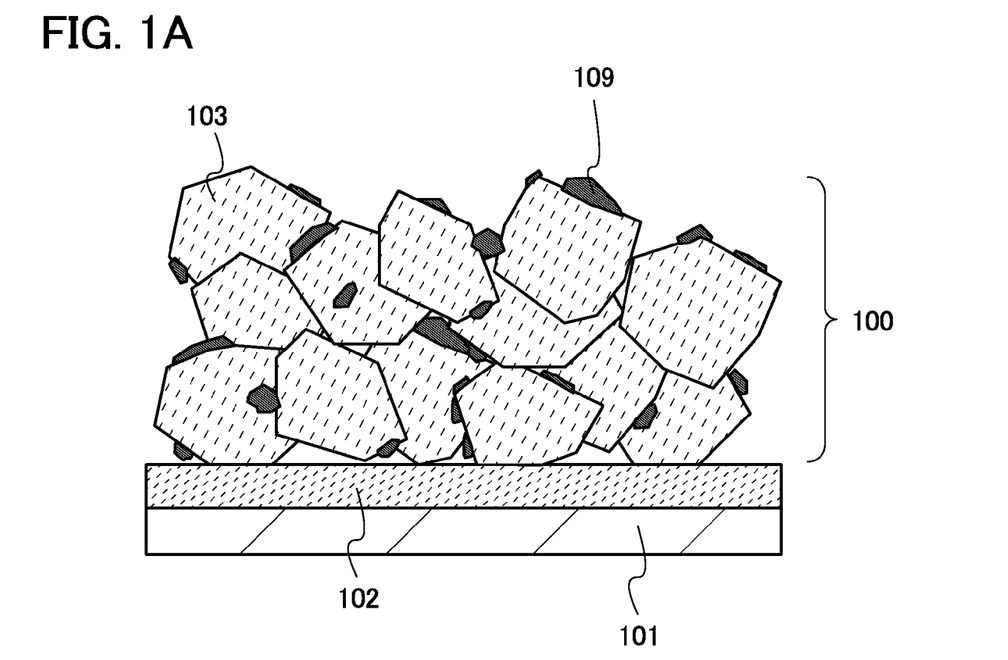
FIGS. 1A and 1B are a cross-sectional view and a top view, respectively, which illustrate an electrode of a power storage device of one embodiment of the present invention.
Figure 1B:
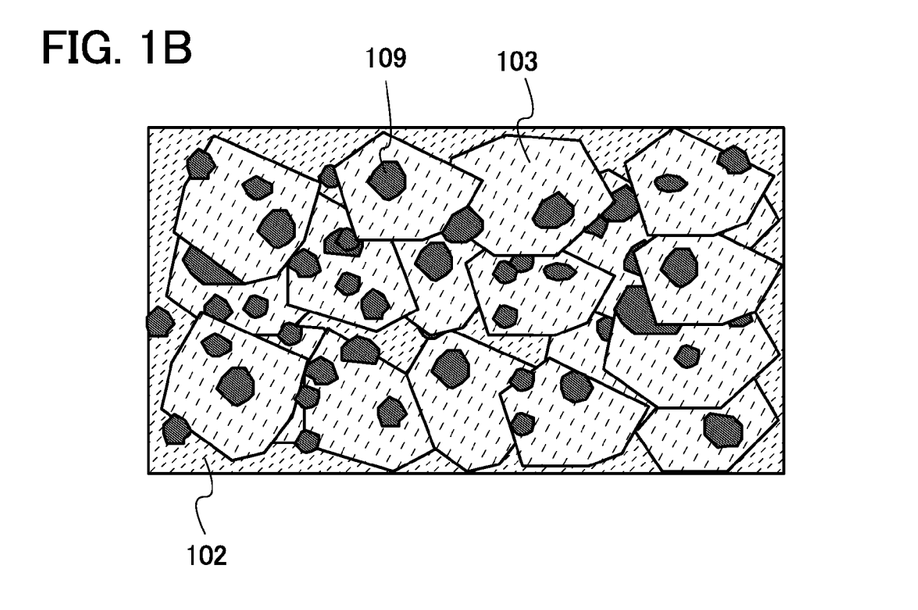

FIGS. 1A and 1B illustrate one embodiment of an electrode of a power storage device. FIG. 1A is a cross-sectional view of the electrode, and FIG. 1B is a top view of the electrode. The electrode of the power storage device in FIGS. 1A and 1B includes a current collector 101, a first active material layer 102 provided over one surface of the current collector 101, and a second active material layer 100 which is over the first active material layer 102 and includes a particle 109 containing niobium oxide and a granular active material 103. Although not illustrated here for simplicity, a binder for fixing particles, a conductive additive for improving electric conductivity, and a viscosity modifier (N-methyl-2-pyrrolidone: NMP) for adjusting viscosity may be included in the second active material layer 100, in addition to the granular active material 103 and the particle 109 containing niobium oxide in FIGS. 1A and 1B.

The current collector 101 is formed as appropriate using a conductive material which can be used for a negative electrode current collector and has heat resistance high enough to withstand heat treatment performed later. Examples of the conductive material which can be used for the current collector include, but are not limited to, copper, platinum, aluminum, nickel, tungsten, molybdenum, titanium, and iron. Note that, in the case of using aluminum for the current collector, an aluminum alloy to which an element that improves heat resistance, such as silicon, titanium, neodymium, scandium, or molybdenum, is added is preferably used. Alternatively, an alloy of any of the above conductive materials may be used.

Alternatively, the current collector 101 may be formed using a metal element that forms silicide by reacting with silicon. Examples of the metal element that forms silicide by reacting with silicon include zirconium, titanium, hathium, vanadium, niobium, tantalum, chromium, molybdenum, tungsten, cobalt, and nickel.

Alternatively, an oxide conductive material can be used for the current collector 101. Typical examples of the oxide conductive material include indium oxide containing tungsten oxide, indium zinc oxide containing tungsten oxide, indium oxide containing titanium oxide, indium tin oxide containing titanium oxide, indium tin oxide, indium zinc oxide, and indium tin oxide to which silicon oxide is added. Note that the current collector 101 may have a foil shape, a plate shape, or a net shape. With such a shape, the current collector 101 can hold its shape by itself, and a supporting substrate or the like is therefore not essential.

The first active material layer 102 and the granular active material 103 are each preferably formed using a material that can be alloyed with an element whose ion gives or receives electric charge. The ion which gives or receives electric charge is an ion of an alkali metal such as lithium or sodium; an ion of an alkaline earth metal such as calcium, strontium, or barium; a beryllium ion; or a magnesium ion, and a lithium ion is preferably used. The first active material layer 102 and the granular active material 103 can each be formed using, as a material that can be alloyed with lithium, one or more materials selected from silicon, tin, aluminum, and germanium, for example.

The first active material layer 102 can be formed by a thermal chemical vapor deposition (CVD) method in which heating is performed with the use of a deposition gas as a raw material to form a film, a low-pressure chemical vapor deposition (LPCVD) method, or a plasma CVD method in which a deposition gas is decomposed by plasma to form a film. Alternatively, a sputtering method, an evaporation method, a printing method, or the like can be used.

For example, in the case of using silicon for the first active material layer, a silicon layer can be formed over the current collector 101 by a plasma CVD method or the like. In this case, it is preferable that hydrogen be contained as little as possible in a source gas for formation of the silicon layer. Thus, defects formed in silicon, such as dangling bonds, can be increased and insertion/extraction reaction of ions which give or receive electric charge can be easily caused.

Slurry including the particle 109 containing niobium oxide and the granular active material 103 is applied to the first active material layer 102 and baking is performed, so that the second active material layer 100 can be formed over the first active material layer 102. At this time, an active material with a small grain diameter is preferably used because the power storage capacity per unit volume can be increased.

The particle 109 containing niobium oxide can be formed by a sol-gel method, a solid phase method, or the like. Instead of using niobium oxide, an oxide of vanadium, tantalum, tungsten, zirconium, molybdenum, hafnium, chromium, or titanium can be used. In addition, the crystal structure of the particle 109 containing niobium oxide may be any of an amorphous structure, a polycrystalline structure, and a single-crystal structure.

<Method for Forming Particle Containing Niobium Oxide>

Here, a method for forming the particle 109 containing niobium oxide is described. First, ethyl acetoacetate serving as a stabilizer and toluene serving as a solvent are stirred into niobium alkoxide ($Nb(OCH_2CH_3)_5$), so that a solution is obtained. Then, niobium alkoxide in the solution gradually reacts with moisture in the air and is condensed into a gel through hydrolysis reaction expressed by Chemical Formula 1.

$$Nb(OCH_2CH_3)_5 + 5H_2O \rightarrow Nb(OH)_5 + 5CH_3CH_2OH \quad \text{(Chemical Formula 1)}$$

The gel obtained through the above steps is diluted with water and stirred using an ultrasonic cleaner, so that a dispersion liquid is formed. Next, the dispersion liquid is subjected to baking (at approximately 500° C. to 600° C.); thus, a particle containing niobium oxide can be produced from the $Nb(OH)_5$ gel through condensation reaction expressed by Chemical Formula 2.

$$2Nb(OH)_5 \rightarrow (Nb(OH)_4)_2O + H_2O \quad \text{(Chemical Formula 2)}$$

In the above manner, the particle 109 containing niobium oxide can be formed.

Further, the granular active material 103, e.g., a silicon particle can be mixed into the gel produced through the hydrolysis reaction expressed by Chemical Formula 1. This enables the particles 109 containing niobium oxide to be uniformly attached to the granular active material 103.

<Method for Manufacturing Electrode>

Next, a method for manufacturing the electrode illustrated in FIGS. 1A and 1B is described with reference to FIG. 2.

Figure 2:
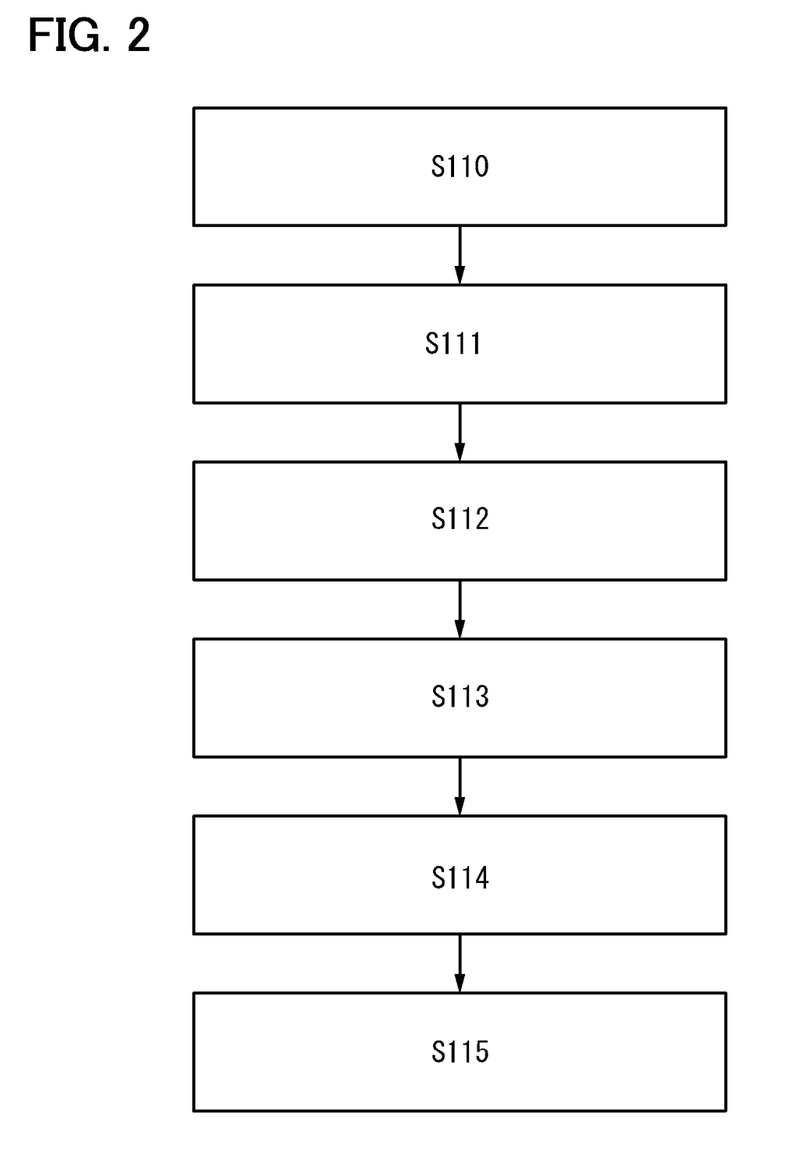
FIG. 2 is a chart showing a method for manufacturing an electrode of one embodiment of the present invention.

First, as shown in Step S110 in FIG. 2, a first active material layer is formed over a current collector. For example, a titanium sheet may be used as the current collector, and a silicon layer may be formed as the first active material layer over the current collector by a plasma CVD method. The silicon layer may contain an impurity element that generates a carrier, such as phosphorus or boron. For example, in order to make phosphorus be contained in the silicon layer, phosphine may be contained in a source gas. Note that there is no particular limitation on the crystallinity of the silicon layer. The silicon layer may be amorphous or crystalline. For example, amorphous silicon, microcrystalline silicon, or polycrystalline silicon can be used. Here, a crystallization step may be performed on the silicon layer. In the case where the silicon layer is subjected to a crystallization step, after the hydrogen concentration in the silicon layer is sufficiently reduced, the silicon layer may be crystallized by heat treatment or laser irradiation.

Further, the thickness of the first active material layer 102 is greater than or equal to 1 nm and less than or equal to 800 nm, preferably greater than or equal to 50 nm and less than or equal to 200 nm. Too large a thickness of the first active material layer easily causes separation of the film due to expansion and contraction of the active material which occur along with charge and discharge of the battery; therefore, the thickness is preferably controlled to fall within the above range.

Next, as shown in Step S111 in FIG. 2, slurry is applied to the first active material layer. The slurry includes the granular active material 103 and the particle 109 containing niobium oxide. The thickness of the applied slurry is preferably, but not limited to, greater than or equal to 20 μm and less than or equal to 30 μm and may be adjusted as appropriate in accordance with desired battery characteristics.

By applying the slurry to the first active material layer, the second active material layer 100 including the particle 109 containing niobium oxide and the granular active material 103 is formed as illustrated in FIGS. 1A and 1B. The area where the particle 109 containing niobium oxide is in contact with a surface of the granular active material 103 is preferably as large as possible. Further, an alloy of niobium and the active material may be formed in a portion where the granular active material 103 and the particle 109 containing niobium oxide are in contact with each other.

<Method for Forming Slurry>

Here, a method for forming the slurry is described. The particle containing niobium oxide formed in the above manner by a sol-gel method or the like, the granular active material, a binder, a conductive additive, and a viscosity modifier are mixed and stirred; thus, slurry in which the particle containing niobium oxide is attached to a surface of the granular active material is formed. The slurry is prepared in such a manner that the conductive additive is dispersed in a solvent including the binder and then the active material is mixed therein. At this time, in order to improve the dispersion property, it is preferable to reduce the amount of the solvent so that a thick paste is obtained. After that, the solvent is added and the slurry is formed. The proportions of the particle containing niobium oxide, the active material, the conductive additive, the binder, and the solvent can be adjusted as appropriate; the higher the proportions of the conductive additive and the binder are, the higher the battery performance per amount of the active material can be.

Note that favorable charge-discharge capacity and cycle characteristics can be obtained when the grain diameter of the granular active material is small, and the grain diameter is preferably 10 µm or less, for example. Similarly, favorable charge-discharge capacity and cycle characteristics can be obtained when the grain diameter of the particle containing niobium oxide is small, and the grain diameter is preferably greater than or equal to 1 nm and less than or equal to 5 µm, more preferably greater than or equal to 1 nm and less than or equal to 500 nm.

As the conductive additive, a material which is itself an electron conductor and does not cause chemical reaction with other materials in a battery device is used. For example, carbon-based materials such as graphite, carbon fiber, carbon black, acetylene black, Ketjenblack, and VGCF (registered trademark); metal materials such as copper, nickel, aluminum, and silver; and powder, fiber, and the like of mixtures thereof can be given. The conductive additive is a material that assists electric conductivity between active materials; it is provided between active materials which are apart from each other and makes conduction between the active materials.

As examples of the binder, polyimide; polysaccharides such as starch, carboxymethyl cellulose, hydroxypropyl cellulose, regenerated cellulose, and diacetyl cellulose; vinyl polymers such as polyvinyl chloride, polyethylene, polypropylene, polyvinyl alcohol, polyvinyl pyrrolidone, polytetrafluoroethylene, polyvinylidene fluoride, ethylene-propylene-diene monomer (EPDM) rubber, sulfonated EPDM rubber, styrene-butadiene rubber, butadiene rubber, and fluorine rubber; and polyether such as polyethylene oxide can be given.

As the solvent, water, N-methyl-2-pyrrolidone, lactic acid ester, or the like can be used.

Next, as shown in Step S112 in FIG. 2, heat treatment is performed to vaporize the solvent included in the slurry. The heat treatment may be performed using a hot plate, an oven, or the like at 350° C. in a nitrogen atmosphere, for example.

Next, as shown in Step S113, the slurry is preferably pressed downward with the use of a press machine or the like so that the adhesion between the first active material layer and the slurry is increased. Moreover, the second active material layer is planarized by the pressing.

Next, as shown in Step S114, the current collector may be punched out so that a desired shape is obtained.

Lastly, as shown in Step S115, heat treatment is performed again in order to fully vaporize the solvent. The heat treatment may be performed at 100° C. in a reduced-pressure atmosphere, for example.

Through the above steps, the electrode illustrated in FIGS. 1A and 1B can be manufactured.

As described above, contact between the granular active material and the particle containing niobium oxide makes the granular active material physically fixed; accordingly, deterioration due to expansion and contraction of the active material which occur along with charge and discharge of the battery, such as powdering of the active material, can be suppressed.

Further, since the particle containing niobium oxide is formed in contact with the active material, an organic SEI can be prevented from being formed on the surface of the active material. Consequently, effects of reduction in resistance, improvement in lithium diffusivity, suppression of volume expansion of the active material, and the like can be achieved.

Moreover, the first active material layer is formed over the current collector before the second active material layer including the particle containing niobium oxide and the granular active material is formed over the current collector, whereby increase in electric resistance due to niobium oxide provided between the current collector and the active material can be prevented.

Thus, the electrode used for the power storage device is manufactured by forming the first active material layer and the second active material layer that is over the first active material layer and includes the particle containing niobium oxide and the granular active material, whereby the cycle characteristics and rate characteristics of the power storage device can be improved.

(Embodiment 2)

In this embodiment, a structure of a power storage device is described with reference to FIGS. 3A and 3B.

First, a structure of a secondary battery is described below as a power storage device. Here, a structure of a lithium secondary battery that is a typical example of a secondary battery is described.

Figure 3A:
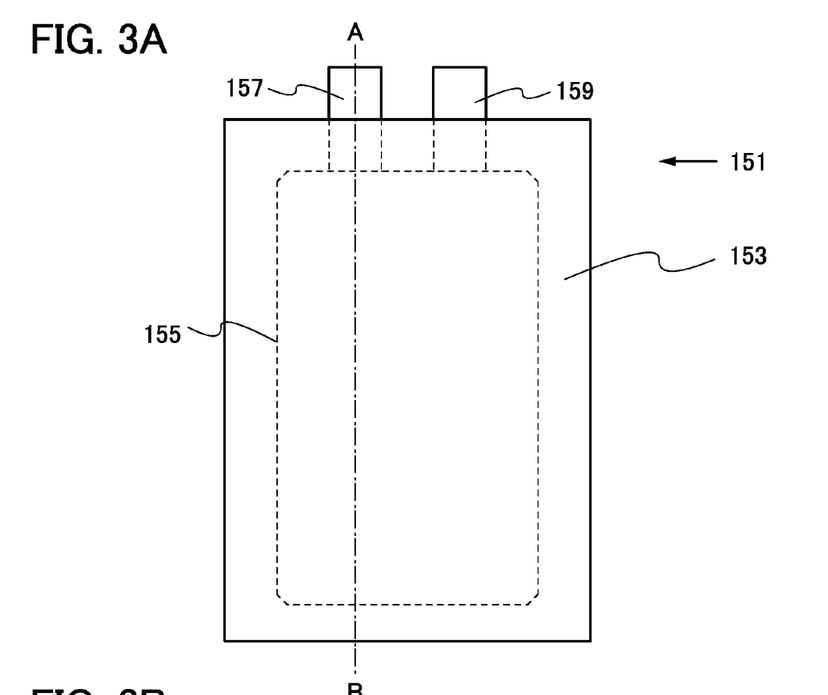
FIGS. 3A and 3B are a plan view and a cross-sectional view, respectively, which illustrate one embodiment of a power storage device.
Figure 3B:
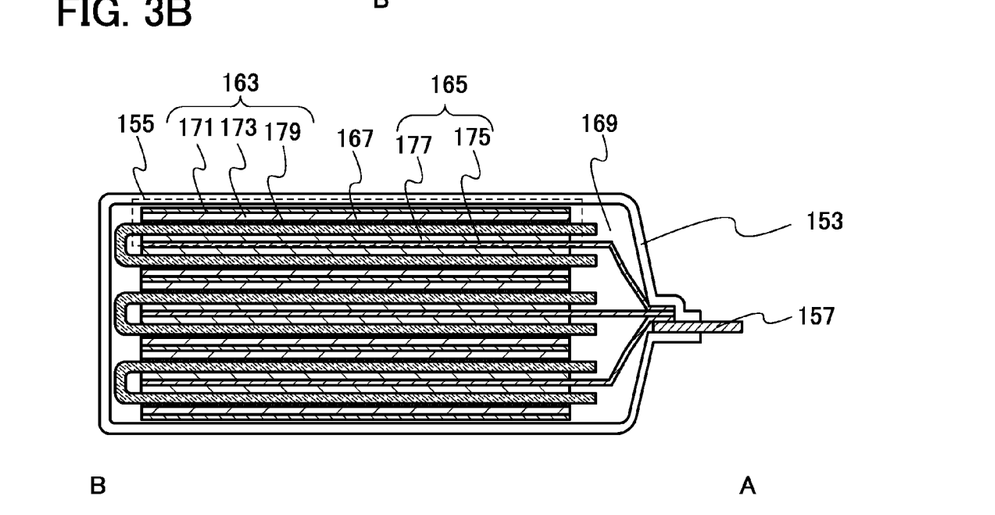

FIG. 3A is a plan view of a power storage device 151, and FIG. 3B is a cross-sectional view taken along dashed-dotted line A-B in FIG. 3A. In this embodiment, a sealed thin power storage device is described as the power storage device 151.

The power storage device 151 illustrated in FIG. 3A includes a power storage cell 155 in an exterior member 153. The power storage device 151 further includes terminal portions 157 and 159 which are connected to the power storage cell 155. For the exterior member 153, a laminate film, a polymer film, a metal film, a metal case, a plastic case, or the like can be used.

As illustrated in FIG. 3B, the power storage cell 155 includes a negative electrode 163, a positive electrode 165, a separator 167 provided between the negative electrode 163 and the positive electrode 165, and an electrolyte 169.

The negative electrode 163 includes a negative electrode current collector 171, a first negative electrode active material layer 173, and a second negative electrode active material layer 179. Further, each of the first negative electrode active material layer 173 and the second negative electrode active material layer 179 is formed on one or both surfaces of the negative electrode current collector 171.

The positive electrode 165 includes a positive electrode current collector 175 and a positive electrode active material layer 177. Further, the positive electrode active material layer 177 is formed on one or both surfaces of the positive electrode current collector 175.

The negative electrode current collector 171 is connected to the terminal portion 159. The positive electrode current collector 175 is connected to the terminal portion 157. Further, the terminal portions 157 and 159 each partly extend outside the exterior member 153.

Note that, although the sealed thin power storage device is described as the power storage device 151 in this embodiment, the power storage device can have a variety of structures; for example, a button power storage device, a cylindrical power storage device, or a rectangular power storage device can be used. Further, although the structure where the positive electrode, the negative electrode, and the separator are stacked is described in this embodiment, a structure where the positive electrode, the negative electrode, and the separator are rolled may be employed.

As the negative electrode current collector 171, the current collector 101 described in Embodiment 1 can be used.

As the first negative electrode active material layer 173, the first active material layer 102 described in Embodiment 1 can be used. In addition, silicon, which has high capacity, is preferably used as the active material.

As the second negative electrode active material layer 179, the second active material layer 100 described in Embodiment 1 can be used.

Aluminum, stainless steel, or the like is used for the positive electrode current collector 175. The positive electrode current collector 175 can have a foil shape, a plate shape, a net shape, a film shape, or the like as appropriate.

The positive electrode active material layer 177 can be formed using $LiFeO_2$, $LiCoO_2$, $LiNiO_2$, $LiMn_2O_4$, $LiFePO_4$, $LiCoPO_4$, $LiNiPO_4$, $LiMnPO_4$ or another lithium compound, $V_2O_5$, $Cr_2O_5$, or $MnO_2$, as a material. Note that, when carrier ions are alkali metal ions other than lithium ions or alkaline earth metal ions, the positive electrode active material layer 177 can be formed using, instead of lithium in the above lithium compounds, an alkali metal (e.g., sodium or potassium) or an alkaline earth metal (e.g., calcium, strontium, or barium).

As a solute of the electrolyte 169, a material containing lithium ions, i.e., carrier ions is used. Typical examples of the solute of the electrolyte include lithium salt such as $LiClO_4$, $LiAsF_6$, $LiBF_4$, $LiPF_6$, and $Li(C_2F_5SO_2)_2N$. Note that, when carrier ions are alkali metal ions other than lithium ions or alkaline earth metal ions, the solute of the electrolyte 169 can be formed using alkali metal salt such as sodium salt or potassium salt; alkaline earth metal salt such as calcium salt, strontium salt, or barium salt; beryllium salt; magnesium salt; or the like, as appropriate.

As a solvent of the electrolyte 169, a material which can transfer lithium ions (or other carrier ions) is used. As the solvent of the electrolyte 169, an aprotic organic solvent is preferably used. Typical examples of the aprotic organic solvent include ethylene carbonate, propylene carbonate, dimethyl carbonate, diethyl carbonate, γ-butyrolactone, acetonitrile, dimethoxyethane, and tetrahydrofuran, and one or more of these materials can be used. When a gelled polymer is used as the solvent of the electrolyte 169, safety against liquid leakage or the like is increased. In addition, the power storage device 151 can be thin and lightweight. Typical examples of the gelled polymer include a silicon gel, an acrylic gel, an acrylonitrile gel, polyethylene oxide, polypropylene oxide, and a fluorine-based polymer.

Alternatively, a solid electrolyte such as $Li_3PO_4$, $Li_3PO_{(4-x)}N_x$, or $Li_xPS_y$ (x, y: natural number) can be used as the electrolyte 169. Further, the electrolyte 169 may contain niobium. The electrolyte 169 may contain vinylene carbonate or the like.

An insulating porous material is used for the separator 167. Typical examples of the separator 167 include cellulose (paper), polyethylene, polypropylene, and glass fiber. A single layer or a stack of any of these materials can be used.

A lithium secondary battery has small memory effect, high energy density, and high discharge capacity. In addition, the output voltage of the lithium secondary battery is high. For those reasons, the size and weight of the lithium secondary battery can be reduced. Further, the lithium secondary battery does not easily deteriorate owing to repetitive charge and discharge and can be used for a long time, leading to cost reduction of the power storage device.

Next, a capacitor is described as a power storage device. Typical examples of the capacitor include a double-layer capacitor and a lithium-ion capacitor.

In the case of a capacitor, the positive electrode active material layer 177 in the secondary battery illustrated in FIG. 3B is formed using a material into which lithium ions (or other carrier ions) and/or anions can be reversibly inserted. Typically, the positive electrode active material layer 177 can be formed using active carbon, a conductive polymer, or a polyacenic semiconductor (PAS), for example.

The lithium-ion capacitor has high charge-discharge efficiency which allows rapid charge and discharge, and has a long life to withstand repetitive use.

By using the electrode described in Embodiment 1 as the negative electrode 163, a power storage device having better cycle characteristics and rate characteristics can be manufactured.

In addition, by using the current collector, the first active material layer, and the second active material layer described in Embodiment 1 in a negative electrode of an air cell which is one embodiment of a power storage device, a power storage device having better cycle characteristics and rate characteristics can be manufactured.

As described above, in one embodiment of the present invention, the current collector, the first active material layer, and the second active material layer including the particle containing niobium oxide and the granular active material can be used. Accordingly, a power storage device having better cycle characteristics and rate characteristics can be provided. A power storage device which is less likely to deteriorate owing to separation of an active material, or the like can be provided.

(Embodiment 3)

In this embodiment, application examples of the power storage device described in Embodiment 2 are described with reference to FIGS. 4A to 4D.

The power storage device described in Embodiment 2 can be used in electronic devices, e.g., cameras such as digital cameras or video cameras, digital photo frames, mobile phones (also referred to as cellular phones or cellular phone devices), portable game machines, portable information terminals, and audio reproducing devices. Further, the power storage device can be used in electric propulsion vehicles such as electric cars, hybrid cars, train vehicles, maintenance vehicles, carts, and electric wheelchairs. Here, examples of the electric propulsion vehicles are described.

Figure 4A:
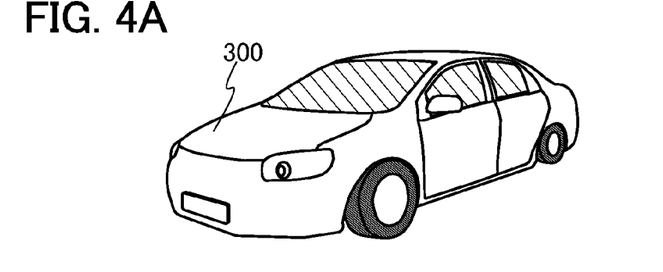
FIGS. 4A to 4D are perspective views illustrating application examples of a power storage device.
Figure 4B:
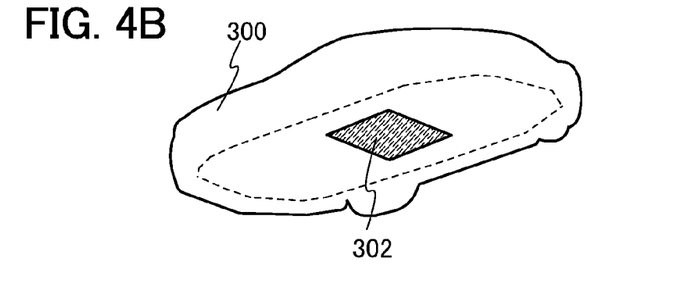

FIG. 4A illustrates a structure of a four-wheeled automobile 300 which is one of the electric propulsion vehicles. The automobile 300 is an electric car or a hybrid car. The automobile 300 is an example in which a power storage device 302 is provided in a bottom portion. In order to clearly show the position of the power storage device 302 in the automobile 300, FIG. 4B illustrates the outline of the automobile 300 and the power storage device 302 provided in the bottom portion of the automobile 300. The power storage device described in Embodiment 2 can be used as the power storage device 302. The power storage device 302 can be charged by external power supply using a plug-in technique or a wireless power feeding system.

Figure 4C:
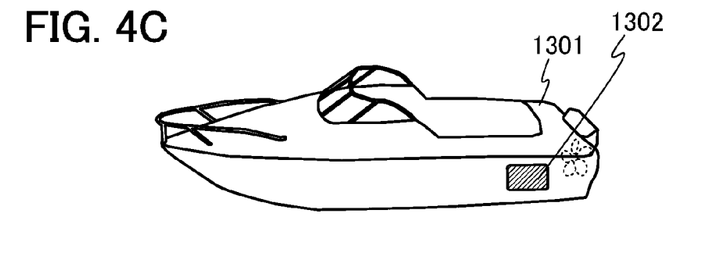

FIG. 4C illustrates a structure of a motorboat 1301 which is one of the electric propulsion vehicles. FIG. 4C illustrates the case where a power storage device 1302 is provided on a side portion of the body of the motorboat 1301. The power storage device described in Embodiment 2 can be used as the power storage device 1302. The power storage device 1302 can be charged by external power supply using a plug-in technique or a wireless power feeding system. For example, a power feeding device for charging the motorboat 1301 (i.e., for charging the power storage device 1302) may be provided at a mooring in a harbor.

Figure 4D:
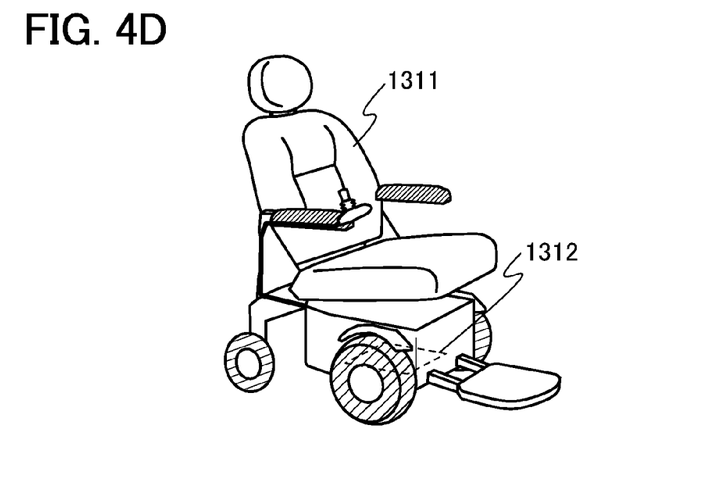

FIG. 4D illustrates a structure of an electric wheelchair 1311 which is one of the electric propulsion vehicles. FIG. 4D illustrates the case where the electric wheelchair 1311 includes a power storage device 1312 in a bottom portion. The power storage device described in Embodiment 2 can be used as the power storage device 1312. The power storage device 1312 can be charged by external power supply using a plug-in technique or a wireless power feeding system.

(Embodiment 4)

In this embodiment, an example in which a secondary battery that is an example of a power storage device of one embodiment of the present invention is used in a wireless power feeding system or radio frequency power feeding system (hereinafter referred to as an RF power feeding system) is described with reference to block diagrams of FIG. 5 and FIG. 6. In each of the block diagrams, independent blocks show elements within a power receiving device and a power feeding device, which are classified according to their functions. However, it may be practically difficult to completely separate the elements according to their functions; in some cases, one element can involve a plurality of functions.

First, the RF power feeding system is described with reference to FIG. 5.

A power receiving device 600 is an electronic device or an electric propulsion vehicle which is driven by electric power supplied from a power feeding device 700, and can be applied to another device which is driven by electric power, as appropriate. Typical examples of the electronic device include cameras such as digital cameras or video cameras, digital photo frames, mobile phones (also referred to as cellular phones or cellular phone devices), portable game machines, portable information terminals, audio reproducing devices, display devices, and computers. Typical examples of the electric propulsion vehicle include electric cars, hybrid cars, train vehicles, maintenance vehicles, carts, and electric wheelchairs. In addition, the power feeding device 700 has a function of supplying electric power to the power receiving device 600.

Figure 5:
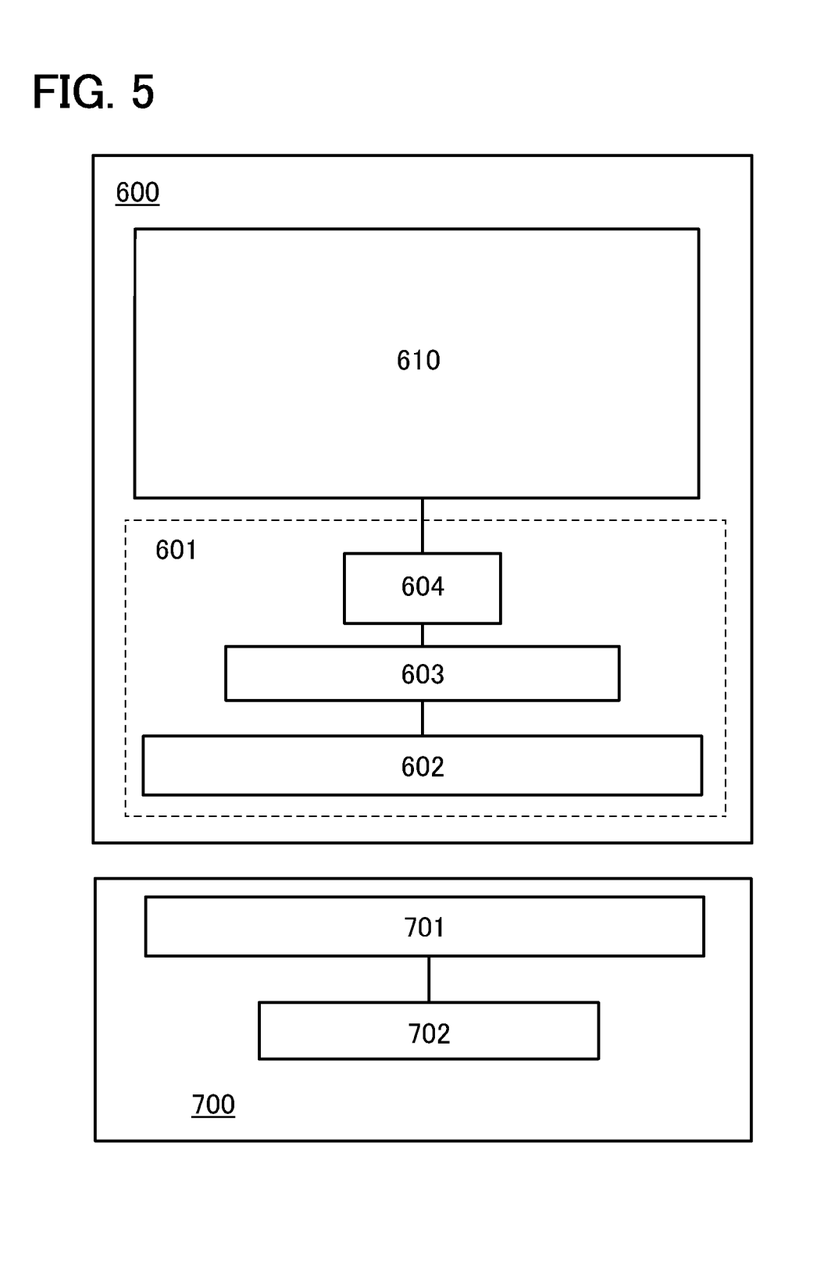
FIG. 5 is a diagram illustrating an example of a structure of a wireless power feeding system.

In FIG. 5, the power receiving device 600 includes a power receiving device portion 601 and a power load portion 610. The power receiving device portion 601 includes at least a power receiving device antenna circuit 602, a signal processing circuit 603, and a secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 or transmitting a signal to the power feeding device antenna circuit 701. The signal processing circuit 603 processes a signal received by the power receiving device antenna circuit 602 and controls charge of the secondary battery 604 and supply of electric power from the secondary battery 604 to the power load portion 610. In addition, the signal processing circuit 603 controls operation of the power receiving device antenna circuit 602. That is, the signal processing circuit 603 can control the intensity, frequency, or the like of a signal transmitted by the power receiving device antenna circuit 602. The power load portion 610 is a driving portion which receives electric power from the secondary battery 604 and drives the power receiving device 600. Typical examples of the power load portion 610 include a motor and a driver circuit. Another device which drives the power receiving device by receiving electric power can be used as the power load portion 610 as appropriate. The power feeding device antenna circuit 701 has a function of transmitting a signal to the power receiving device antenna circuit 602 or receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, frequency, or the like of a signal transmitted by the power feeding device antenna circuit 701.

The secondary battery of one embodiment of the present invention is used as the secondary battery 604 included in the power receiving device 600 in the RF power feeding system illustrated in FIG. 5.

With the use of the secondary battery of one embodiment of the present invention in the RF power feeding system, the discharge capacity or the charge capacity (also referred to as the amount of power storage) can be increased as compared with that of a conventional secondary battery. Therefore, the time interval of the wireless power feeding can be longer (frequent power feeding can be omitted).

In addition, with the use of the secondary battery of one embodiment of the present invention in the RF power feeding system, the power receiving device 600 can be formed to be compact and lightweight if the discharge capacity or charge capacity with which the power load portion 610 can be driven is the same as that of a conventional secondary battery. Therefore, the total cost can be reduced.

Next, another example of the RF power feeding system is described with reference to FIG. 6.

Figure 6:
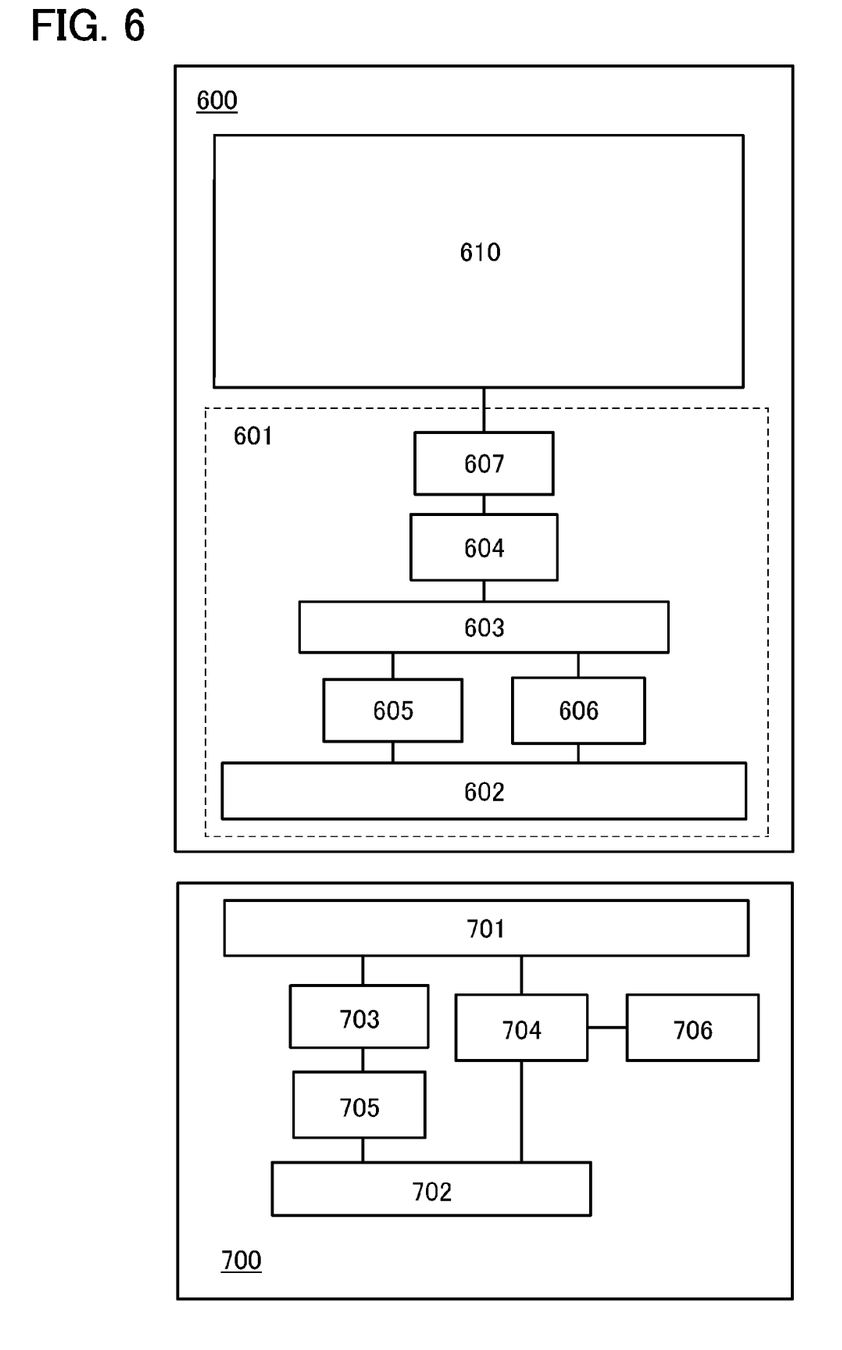
FIG. 6 is a diagram illustrating an example of a structure of a wireless power feeding system.

In FIG. 6, the power receiving device 600 includes the power receiving device portion 601 and the power load portion 610. The power receiving device portion 601 includes at least the power receiving device antenna circuit 602, the signal processing circuit 603, the secondary battery 604, a rectifier circuit 605, a modulation circuit 606, and a power supply circuit 607. The power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted by the power feeding device antenna circuit 701 or transmitting a signal to the power feeding device antenna circuit 701. When the power receiving device antenna circuit 602 receives a signal transmitted by the power feeding device antenna circuit 701, the rectifier circuit 605 generates DC voltage from the signal received by the power receiving device antenna circuit 602. The signal processing circuit 603 has a function of processing a signal received by the power receiving device antenna circuit 602 and controlling charge of the secondary battery 604 and supply of electric power from the secondary battery 604 to the power supply circuit 607. The power supply circuit 607 has a function of converting voltage stored by the secondary battery 604 into voltage needed for the power load portion 610. The modulation circuit 606 is used when a certain response is transmitted from the power receiving device 600 to the power feeding device 700.

With the power supply circuit 607, electric power supplied to the power load portion 610 can be controlled. Thus, overvoltage application to the power load portion 610 can be suppressed, and deterioration or breakdown of the power receiving device 600 can be reduced.

In addition, with the modulation circuit 606, a signal can be transmitted from the power receiving device 600 to the power feeding device 700. Therefore, when it is judged from the amount of charge of the power receiving device 600 that a certain amount of electric power is stored, a signal is transmitted from the power receiving device 600 to the power feeding device 700 so that power feeding from the power feeding device 700 to the power receiving device 600 can be stopped. As a result, the secondary battery 604 is not fully charged, which increases the number of times the secondary battery 604 can be charged.

The power feeding device antenna circuit 701 has a function of transmitting a signal to the power receiving device antenna circuit 602 or receiving a signal from the power receiving device antenna circuit 602. When a signal is transmitted to the power receiving device antenna circuit 602, the signal processing circuit 702 generates a signal which is transmitted to the power receiving device. The oscillator circuit 706 is a circuit which generates a signal with a constant frequency. The modulation circuit 704 has a function of applying voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. On the other hand, when a signal is received from the power receiving device antenna circuit 602, the rectifier circuit 703 rectifies the received signal. From signals rectified by the rectifier circuit 703, the demodulation circuit 705 extracts a signal transmitted from the power receiving device 600 to the power feeding device 700. The signal processing circuit 702 has a function of analyzing the signal extracted by the demodulation circuit 705.

Note that any circuit may be provided between circuits as long as the RF power feeding can be performed. For example, after the power receiving device 600 receives a signal and the rectifier circuit 605 generates DC voltage, a circuit such as a DC-DC converter or regulator that is provided in a subsequent stage may generate constant voltage. Thus, overvoltage application to the inside of the power receiving device 600 can be suppressed.

The secondary battery of one embodiment of the present invention is used as the secondary battery 604 included in the power receiving device 600 in the RF power feeding system illustrated in FIG. 6.

With the use of the secondary battery of one embodiment of the present invention in the RF power feeding system, the discharge capacity or the charge capacity can be increased as compared with that of a conventional secondary battery; therefore, the time interval of the wireless power feeding can be longer (frequent power feeding can be omitted).

In addition, with the use of the secondary battery of one embodiment of the present invention in the RF power feeding system, the power receiving device 600 can be formed to be compact and lightweight if the discharge capacity or charge capacity with which the power load portion 610 can be driven is the same as that of a conventional secondary battery. Therefore, the total cost can be reduced.

Note that, in the case where the secondary battery of one embodiment of the present invention is used in the RF power feeding system and the power receiving device antenna circuit 602 and the secondary battery 604 overlap with each other, it is preferable that the impedance of the power receiving device antenna circuit 602 be not changed by deformation of the secondary battery 604 due to charge and discharge of the secondary battery 604 and deformation of an antenna due to the above deformation. That is because electric power is not supplied sufficiently in some cases when the impedance of the antenna is changed. The secondary battery 604 may be placed in a battery pack formed of metal or ceramics, for example. Note that, in that case, the power receiving device antenna circuit 602 and the battery pack are preferably separated from each other by several tens of micrometers or more.

In this embodiment, the charging signal has no limitation on its frequency and may have any band of frequency as long as electric power can be transmitted. For example, the charging signal may have any of an LF band of 135 kHz (long wave), an HF band of 13.56 MHz (short wave), a UHF band of 900 MHz to 1 GHz (ultra high frequency wave), and a microwave band of 2.45 GHz.

A signal transmission method may be properly selected from various methods including an electromagnetic coupling method, an electromagnetic induction method, a resonance method, and a microwave method. In order to prevent energy loss due to foreign substances containing moisture, such as rain and mud, the electromagnetic induction method or resonance method using a low frequency band, specifically, very-low frequencies of 3 kHz to 30 kHz, low frequencies of 30 kHz to 300 kHz, medium frequencies of 300 kHz to 3 MHz, or high frequencies of 3 MHz to 30 MHz is preferably used.

This embodiment can be implemented in combination with any of the above embodiments.

This application is based on Japanese Patent Application serial no. 2011-191516 filed with the Japan Patent Office on Sep. 2, 2011, the entire contents of which are hereby incorporated by reference.

What is claimed is:

1. A power storage device comprising:
an electrode comprising:
a current collector;
a first active material layer over the current collector, the first active material layer containing one or more materials selected from tin, aluminum, and germanium;
a second active material layer that is over the first active material layer and includes a binder, a particle containing niobium oxide and a granular active material; and
a carbon-based film including a graphene over the second active material layer,
wherein a surface of the granular active material includes a first region where the particle containing niobium oxide is attached to a part of the surface and a second region where the surface is exposed from the particle, and
wherein the binder fixes the particle.

2. The power storage device according to claim 1,
wherein the granular active material contains one or more materials selected from silicon, tin, aluminum, and germanium.

3. The power storage device according to claim 1,
wherein a grain diameter of the particle containing niobium oxide is greater than or equal to 1 nm and less than or equal to 5 µm.

4. A power storage device comprising:
a negative electrode comprising:
a current collector;
a first active material layer over the current collector, the first active material layer containing one or more materials selected from tin, aluminum, and germanium;
a second active material layer that is over the first active material layer and includes a binder, a particle containing niobium oxide and a granular active material; and
a carbon-based film including a graphene over the second active material layer;
an electrolyte in contact with the negative electrode; and
a positive electrode facing the negative electrode with the electrolyte interposed therebetween,
wherein a surface of the granular active material includes a first region where the particle containing niobium oxide is attached to a part of the surface and a second region where the surface is exposed from the particle, and
wherein the binder fixes the particle.

5. The power storage device according to claim 4,
wherein the granular active material contains one or more materials selected from silicon, tin, aluminum, and germanium.

6. The power storage device according to claim 4,
wherein a grain diameter of the particle containing niobium oxide is greater than or equal to 1 nm and less than or equal to 5 µm.

7. A power storage device comprising:
an electrode comprising:
a current collector;
a first active material layer over the current collector, the first active material layer containing one or more materials selected from tin, aluminum, and germanium;
a second active material layer that is over the first active material layer and includes a binder, a particle and a granular active material; and
a carbon-based film including a graphene over the second active material layer,
wherein the particle has a property to conduct carrier ions,
wherein the particle comprises niobium oxide,
wherein a surface of the granular active material includes a first region where the particle is attached to a part of the surface and a second region where the surface is exposed from the particle, and
wherein the binder fixes the particle.

8. The power storage device according to claim 7,
wherein the granular active material contains one or more materials selected from silicon, tin, aluminum, and germanium.

9. The power storage device according to claim 7,
wherein a grain diameter of the particle is greater than or equal to 1 nm and less than or equal to 5 µm.

10. The power storage device according to claim 1,
wherein the granular active material contain the one or more materials of the first active material layer.

11. The power storage device according to claim 4,
wherein the granular active material contain the one or more materials of the first active material layer.

12. The power storage device according to claim 7,
wherein the granular active material contain the one or more materials of the first active material layer.

13. The power storage device according to claim 1,
wherein a thickness of the first active material layer is greater than or equal to 50 nm and less than or equal to 200 nm.

14. The power storage device according to claim 4,
wherein a thickness of the first active material layer is greater than or equal to 50 nm and less than or equal to 200 nm.

15. The power storage device according to claim 7,
wherein a thickness of the first active material layer is greater than or equal to 50 nm and less than or equal to 200 nm.

16. The power storage device according to claim 1,
wherein one of phosphorus and boron is added to the one or more materials of the first active material layer.

17. The power storage device according to claim 4,
wherein one of phosphorus and boron is added to the one or more materials of the first active material layer.

18. The power storage device according to claim 7,
wherein one of phosphorus and boron is added to the one or more materials of the first active material layer.

* * * * *